(12) United States Patent
Horne, Jr.

(10) Patent No.: US 7,221,836 B2
(45) Date of Patent: May 22, 2007

(54) LIGHT DIFFUSING FIBEROPTIC COUPLING

(75) Inventor: Guy E. Horne, Jr., Dudley, MA (US)

(73) Assignee: Karl Storz Endovision, Inc., Charlton, MA (US)

( * ) Notice: Subject to any disclaimer, the term of this patent is extended or adjusted under 35 U.S.C. 154(b) by 283 days.

(21) Appl. No.: 10/639,292

(22) Filed: Aug. 12, 2003

(65) Prior Publication Data

US 2005/0036755 A1    Feb. 17, 2005

(51) Int. Cl.
G02B 6/36    (2006.01)

(52) U.S. Cl. ............... 385/117; 385/139; 385/140; 385/78

(58) Field of Classification Search ............... None
See application file for complete search history.

(56) References Cited

U.S. PATENT DOCUMENTS

| | | |
|---|---|---|
| 4,832,444 A | 5/1989 | Takahashi et al. |
| 6,068,592 A | 5/2000 | Davis |
| 6,081,647 A * | 6/2000 | Roth et al. ............... 385/139 |
| 6,110,107 A * | 8/2000 | Bellahsene et al. ......... 600/182 |
| 6,129,392 A | 10/2000 | Dittrich et al. |
| 6,193,650 B1 | 2/2001 | Ryan, Jr. |
| 6,551,239 B2 | 4/2003 | Renner et al. |

* cited by examiner

*Primary Examiner*—Michelle Connelly-Cushwa
*Assistant Examiner*—Jerry T. Rahll
(74) *Attorney, Agent, or Firm*—St. Onge Steward Johnston & Reens LLC

(57) ABSTRACT

In an endoscopic system there is a source of radiation and a waveguide, which is symmetric about an axis and receptive of the radiation for guiding the radiation therealong. A coupling mechanism engages or disengages the waveguide to or from an endoscope. An attenuator is deployable in a first position when the waveguide is engaged to the endoscope and deployable in a second position when the waveguide is disengaged from the endoscope. When the attenuator is deployed in the first position, the radiation passes from the waveguide to the endoscope and when the attenuator is in the second position, the radiation is at least partially blocked from passing from the waveguide to the endoscope or from exiting the fiber optic cable.

31 Claims, 5 Drawing Sheets

LIGHT DIFFUSING FIBEROPTIC COUPLING

FIELD OF THE INVENTION

This invention relates to an endoscopic system in which a source of radiation can be separated from an endoscope while blocking light emanating from the source of radiation.

BACKGROUND OF THE INVENTION

Conventional endoscopes are supplied with light from an external light source. This source is coupled to the endoscope by means of a detachable fiberoptic cable. Broad spectral energy is transmitted through the fiber optic cable. However, the fiber optic cables are often disconnected from the endoscope while still energized by the light source. It is desirable that the light exiting the fiber optic cable be attenuated when the fiber optic cable is disconnected from the endoscope.

SUMMARY OF THE INVENTION

In an endoscopic system there is a source of radiation and a waveguide, such as a fiber optic cable or light guide fiber. The waveguide is receptive of the radiation and guides the radiation therealong. A coupling mechanism is operative to engage or disengage the waveguide to or from an endoscope. An attenuator is deployed in a first position when the waveguide is engaged to the endoscope and deployed in a second position when the waveguide is disengaged from the endoscope. When the attenuator is deployed in the first position, the radiation passes from the waveguide to the endoscope. When the attenuator is deployed in the second position, the radiation is at least partially blocked or attenuated by the attenuator from passing from the waveguide to the endoscope or from exiting the fiber optic cable.

The invention replaces the distal end fitting of the waveguide with a new fitting, or coupling mechanism comprising a housing and a formed inner leaf spring type structure. When attached to the endoscope, the leaf springs are automatically retracted and will not interfere with the passage of light to the endoscope. When the waveguide is detached from the endoscope, the leaf springs automatically extend to a position in front of the waveguide and provides deflection or attenuation of the light exiting the waveguide. The leaf spring structure is formed such that the leafs form a radial pattern which may take many shapes and forms depending upon the amount of attenuation desired.

The invention has the advantage that it may be retrofitted to existing waveguide cables. In addition it is easy to manufacture and install or assemble resulting in a low cost device. Yet further, the invention is durable and capable of withstanding many thousands of attach/detach cycles.

DETAILED DESCRIPTION OF AN EMBODIMENT OF THE INVENTION

Figure 1:
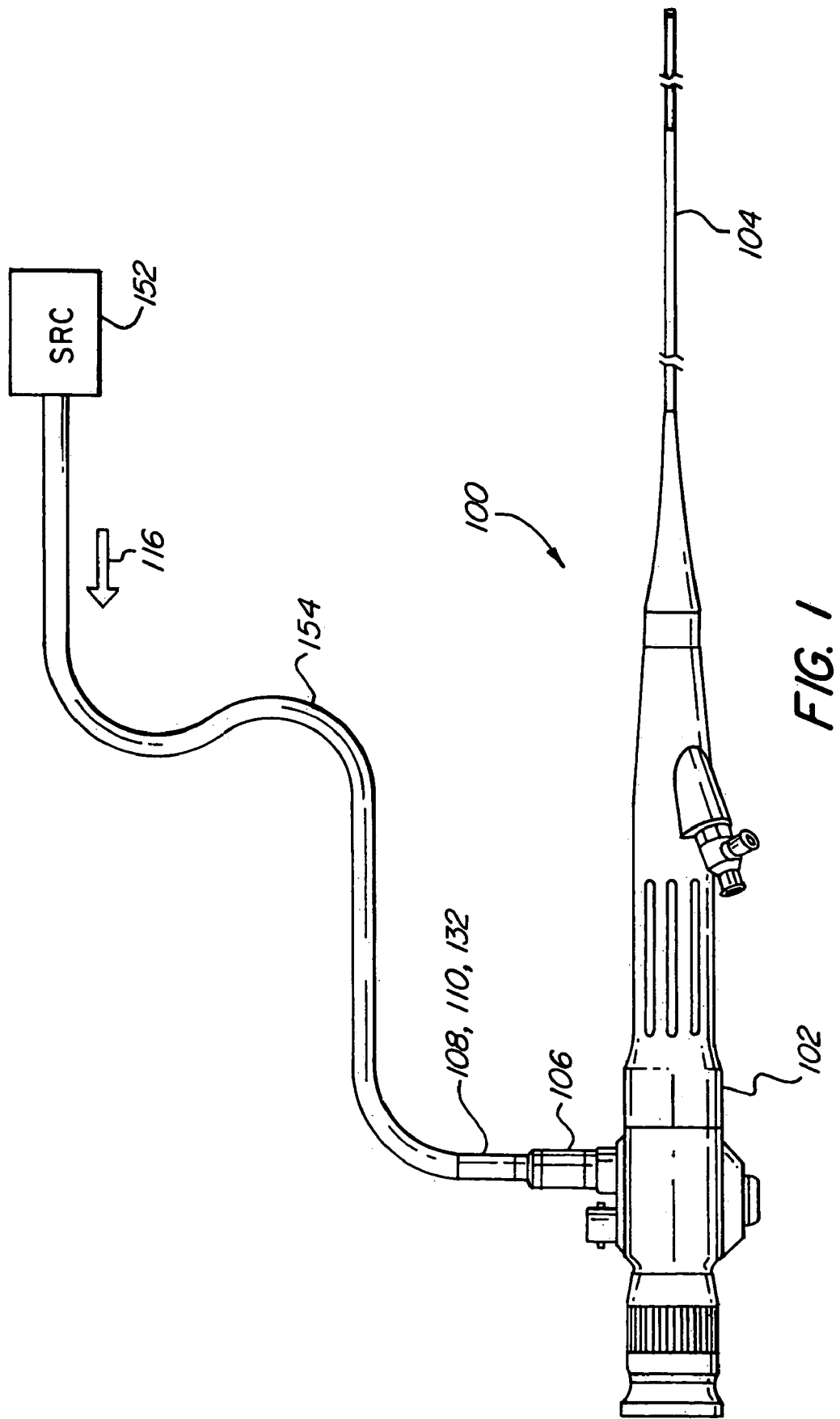
FIG. 1 is a generalized schematic diagram of an endoscopic system.

In FIG. 1, an endoscopic system is shown generally at 100. The endoscopic system 100 includes a source of radiation 152 such as a Xenon lamp for generating a light beam 116. The source of radiation 152 is connected to an endoscope 102, 104 via a waveguide 154, such as a fiber optic cable, at fittings 106, 108, 110, 132. Thus, the light beam 116 is delivered or guided to the endoscope 102, 104 via the waveguide 154. The endoscope includes a main body 102 which houses various mechanical, electrical and optical components. The main body 102 is connected to a flexible insertion shaft 104 for insertion into a body or a cavity.

Figure 2:
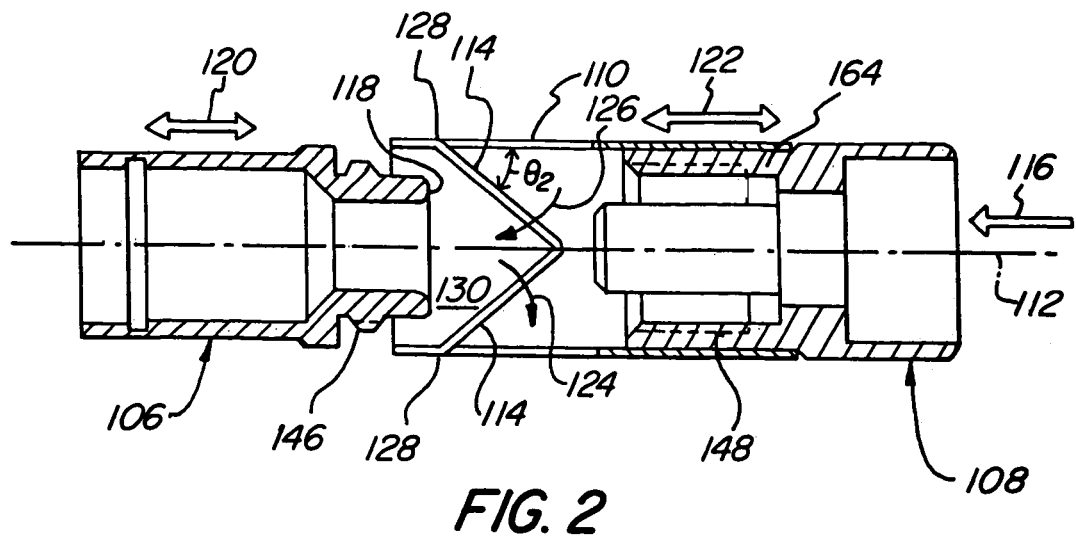
FIG. 2 is a cross sectional view of a first fitting in the nature of a sleeve operative to couple a waveguide to an endoscope including an attenuator for passing or blocking a light beam in the endoscopic system of FIG. 1.
Figure 3A:
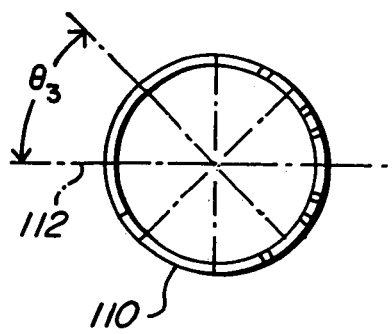
FIG. 3A is an end view of the first fitting of FIG. 3.
Figure 3:
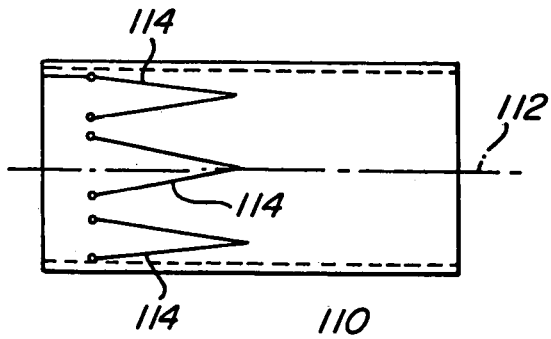
FIG. 3 is an isolated view of the first fitting of FIG. 2.

In FIG. 2, a cross section of the juxtaposition of the fittings 106, 108, 110 is shown. Male fitting 106 is connected to the main body 102 of the endoscope. Female fitting 108 is a terminal fitting of the waveguide 154. A cylindrical sleeve 110, which defines an interior volume 130 and is symmetric about an axis 112, is fitted securely at an open end thereof over an end segment 164 of the terminal fitting 108. The cylindrical sleeve 110 includes a set of cantilever beams 114, which as seen in FIGS. 3 and 3A, are formed from or cut from the walls of the cylindrical sleeve 110. The cantilever beams 114 may be one in number or may be a plurality thereof distributed around the cylindrical sleeve 110 at an angle of $\theta_3$.

As seen in FIG. 2, when the source of radiation is disconnected from the endoscope 102, 104, the terminal fitting 108 and the cylindrical sleeve 110 are separated from fitting 106. In such a position, the cantilever beams 114, due to an intrinsic spring like character, naturally assume a position such that the cantilever beams 114 extend, at an angle of $\theta_2$ from the cylindrical sleeve 110 inward toward the axis 112, thus preventing the light beam 116 from exiting the waveguide 154 or from entering the endoscope 102, 104 through fitting 106. When the source of radiation 152 is coupled to the endoscope 102, 104, the terminal fitting 108 and the cylindrical sleeve 110 are engaged with fitting 106. As such, fitting 106 occupies the interior volume 130 such that a male thread 146 engages a female thread 148. In so doing, as fitting 106 moves 120 in toward the interior volume 130, a butt end 118 of fitting 106 comes into contact with the cantilever beams 114 and causes the cantilever beams 114 to swing out and away 124 from the axis 112. This allows the light beam 116 to pass into the endoscope 102, 104. As the terminal fitting 108 and the cylindrical sleeve 110 are disengaged from fitting 106, fitting 106 moves away from the interior volume 130 and the cantilever beams 114 naturally return 126 toward the axis 112. This blocks the light beam 116 from exiting the waveguide 154 or from entering the endoscope 102, 104 via fitting 106. Thus, the cantilever beams 114 act as an attenuator which opens and closes to allow or prevent the passage of light therethrough by blocking or deflecting the at least a portion of the light exiting the waveguide 154. In general, an attenuator is a device for varying (e.g., decreasing) or blocking a portion of the amount of light allowed through an optical system.

Figure 5:
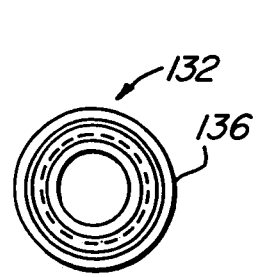
FIG. 5 is an end view of the second fitting of FIG. 4.
Figure 4:
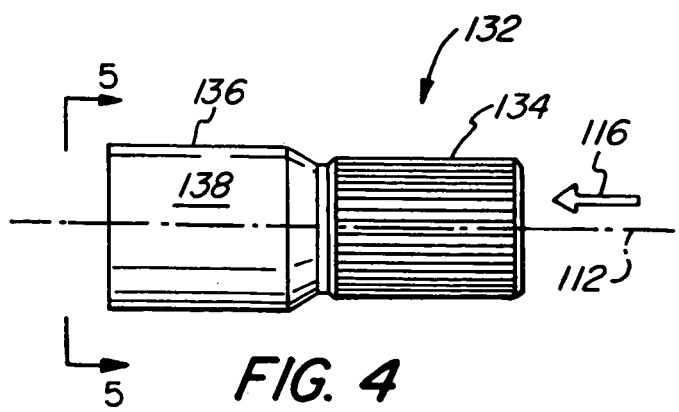
FIG. 4 is an isolated view of the second fitting of FIG. 6.
Figure 6:
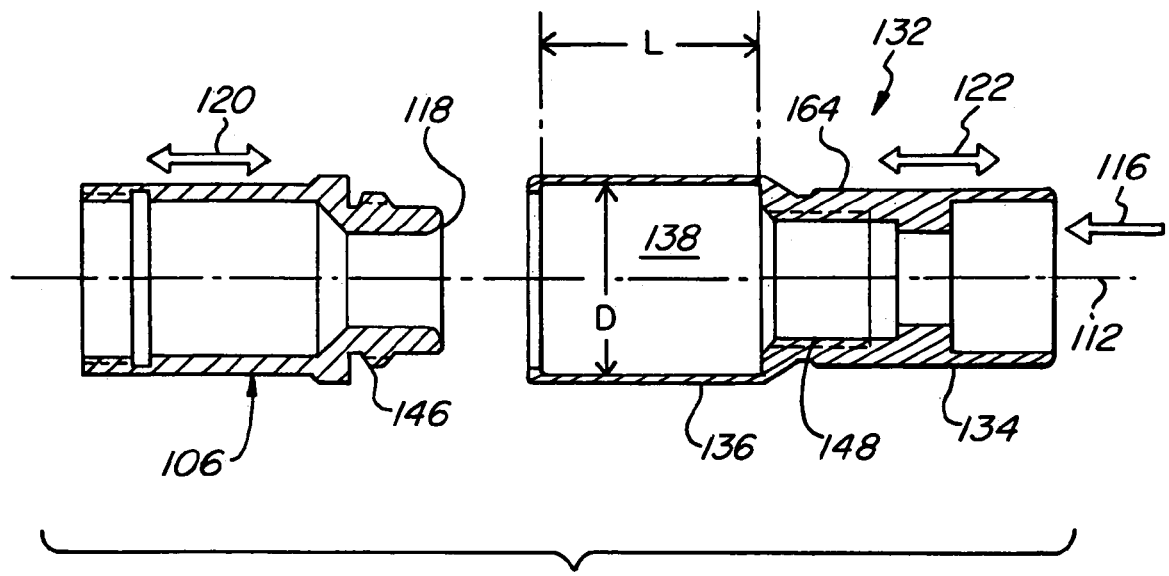
FIG. 6 is a cross sectional view of a second fitting in the nature of a releasable coupling mechanism operative to couple a waveguide to an endoscope.

In FIG. 4, a releasable coupling mechanism or fitting 132, symmetric about the axis 112, is shown. Coupling mechanism 132 comprises a first end 134 and a second end 136. The first end 134 is connected to the waveguide 154 and the second end 136 is connected to fitting 106. The second end 136 defines a cavity 138 having a length, L, and an inside diameter of D (FIG. 6). FIG. 5 displays an end view of the coupling mechanism 132 of FIG. 4. In FIG. 6, the male fitting 106 can be engaged to the coupling mechanism 132 by way of the male thread 146 engaged to the female thread 148 while seated in the cavity 138. As best understood from FIGS. 2–6 fitting 106 may be a male part or a female part and conversely, fitting 108 or coupling mechanism 132 may be female part or a male part.

Figure 7:
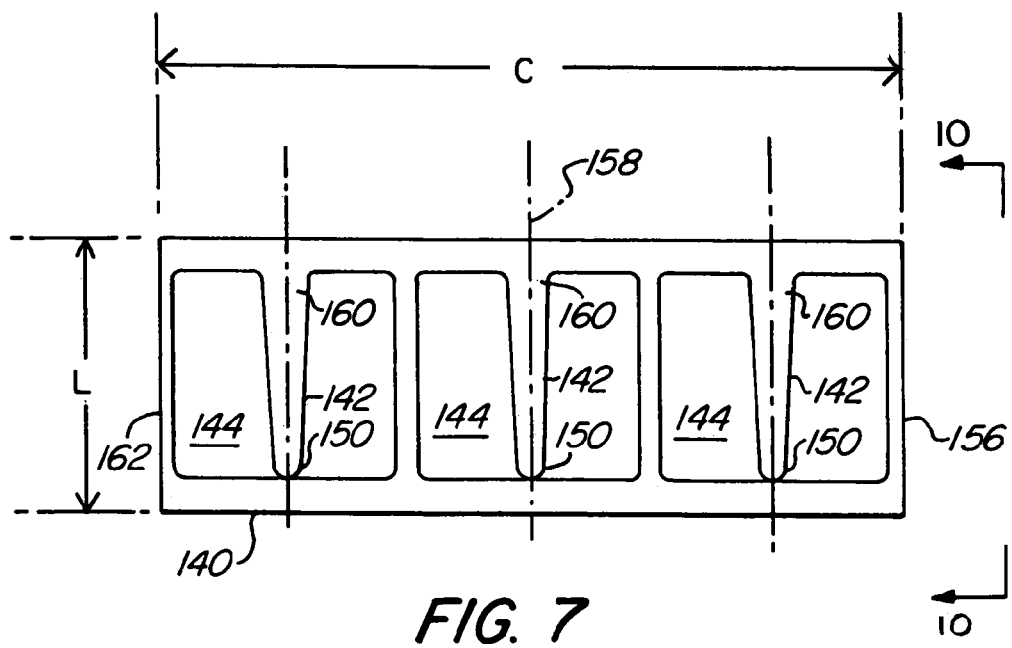
FIG. 7 is plan view of an attenuator for passing or blocking a light beam in the endoscopic system of FIG. 1.
Figure 10:
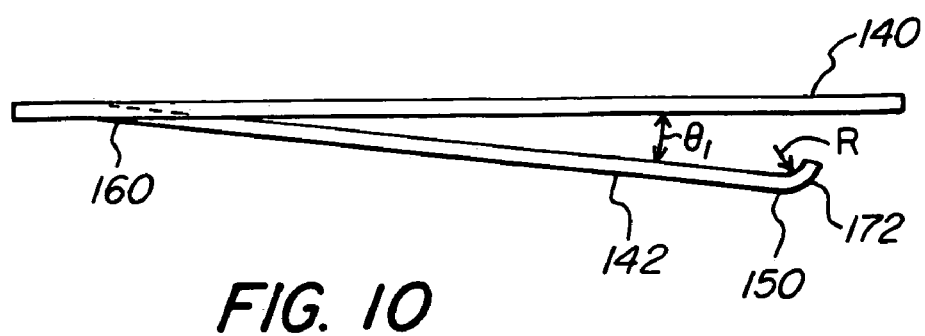
FIG. 10 is a side view of the attenuator of FIG. 7.
Figure 11A:
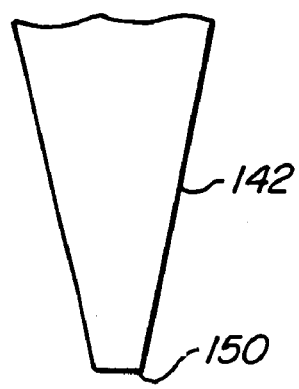
FIGS. 11A, 11B, 11C and 11D show various shapes assumed by the terminal ends of the cantilever beams of the attenuator of FIG. 7.
Figure 11C:
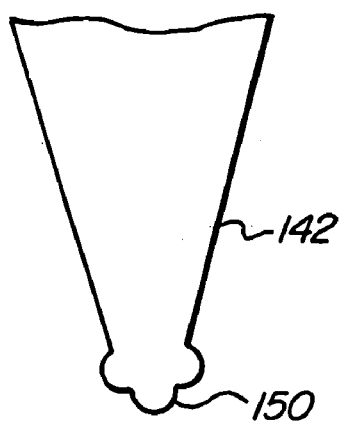
Figure 11B:
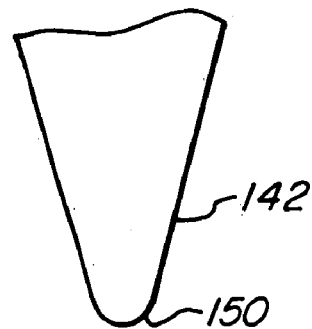
Figure 11D:
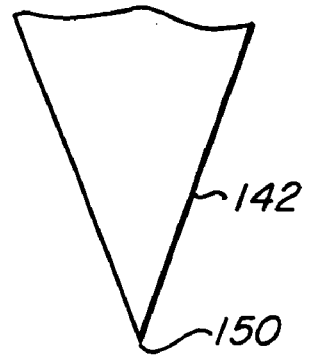

In FIGS. 7 and 10, a pliable sheet 140, such as stainless steel, a Nickel/Titanium alloy, such as Nitinol, or a Bronze/Phosphorous alloy is shown that includes at least one cantilever beam 142 cut out from the pliable sheet 140. The cutout thus forms an opening 144 in the pliable sheet 140. The cantilever beams 142 are generally triangular in shape, but need not be so restricted in shape. The cantilever beams 142 at their terminal end 150 may take on any of a number of shapes. Such shapes are shown in FIGS. 11A, 11B, 11C and 11D and include a square-like end, a rounded end, a three-pointed end and a straight tipped end. The cantilever beam 142 is joined to the pliable sheet 140 at 160 and terminated at 150 and can be made to possess an initial angular displacement $\theta_1$. It is also advantageous in the invention to utilize a material in the pliable sheet 140 or sleeve 110 such as a shape memory alloy (SMA) that returns to an original position or configuration when subject to a thermal procedure such as the application of heat thereto. Yet further it is also advantageous to utilize a material in the pliable sheet 140 or sleeve 110 having spring-like properties or high fatigue resistance so as to be capable of withstanding numerous, repeated engagements and disengagements of the male fitting 106 and the sleeve 110 or releasable coupling mechanism 132.

Figure 8:
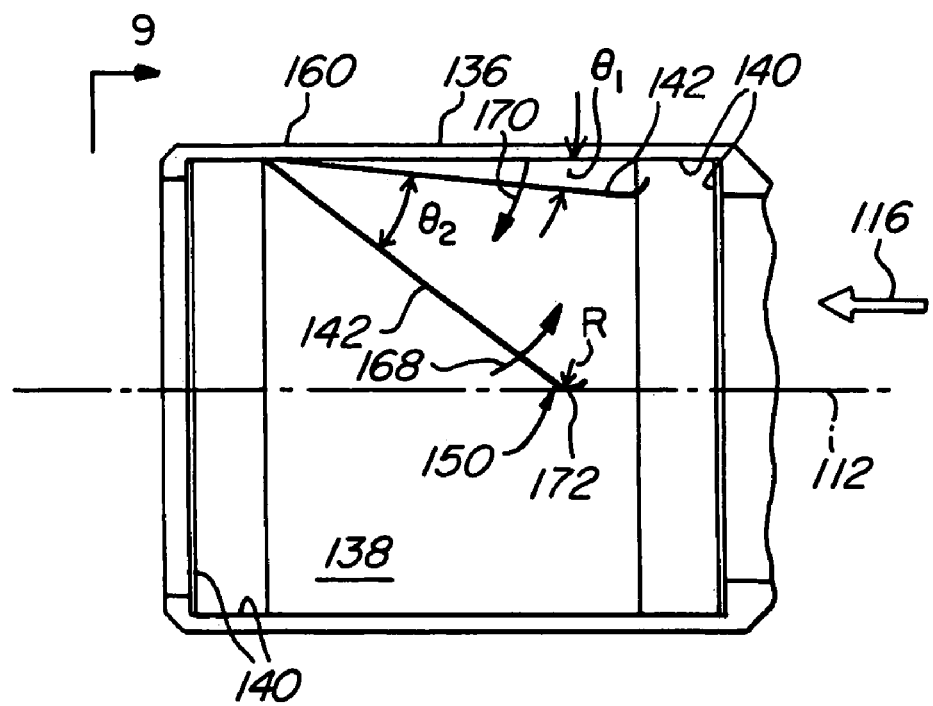
FIG. 8 is a cross sectional view of the second fitting including the attenuator of FIG. 7 positioned therein.

In FIGS. 8 and 10, the terminal end 150 of the cantilever beams 142 include a rounded or curved lip 172 to allow the fitting 106 and the sleeve 110 or releasable coupling mechanism 132 to disengage from a mated configuration without locking or binding up. The lip 172 is curved away from the axis 112 and has a radius of R.

Figure 9:
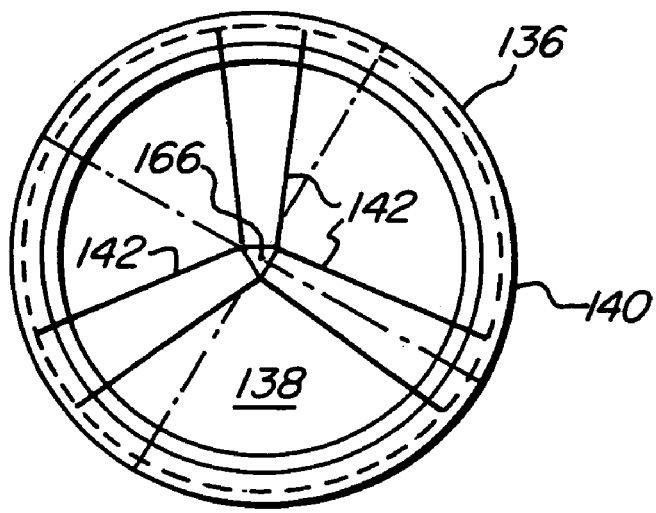
FIG. 9 is an end view of the second fitting of FIG. 8.

As best understood from FIGS. 6, 7 and 8, the pliable sheet 140 is flexible enough such that the pliable sheet 140 can be rolled or rotated about an axis 158 into a generally cylindrical form such that the edges 156, 162 are brought into contact with one another therealong. The pliable sheet 140 can then be placed, in this configuration, within the cavity 138 of the second end 136 such that the length, L, of the pliable sheet 140 and that of the cavity 138 are nearly equal. When so positioned, the axis 158 and axis 112 are substantially coincidental. The pliable sheet 140 is typically about 0.004 inches in thickness. It will also be understood that the dimension C of the pliable sheet 140 equals $\pi \times D$. When the pliable sheet 140 is so placed within the cavity 138 of the second end 136, as seen in FIGS. 8 and 9, fitting 106 and second end 136 may be joined as in FIG. 2, whereby the male thread 146 is engaged with the female thread 148. When fitting 106 and the second end 136 are so mated or engaged, the butt end 118 of fitting 106 has come into contact with the cantilever beam 142 and displaced the cantilever beam 142 outward and away from the axis 112, thus allowing passage of the light beam 116 from the waveguide 154 to the endoscope 102, 104. When fitting 106 and the second end 136 are disengaged, the cantilever beam 142 naturally moves within the cavity 138 toward the axis 112 so as to block passage of the light beam 116 out of the waveguide 154 or into the endoscope 102, 104. Thus, the cantilever beam 142 acts as an attenuator 166 symmetric about axis 112 which opens and closes to allow or prevent the passage of light from the waveguide 154 to the endoscope 102, 104.

Thus, it is seen that based upon the foregoing description of the invention, an endoscopic system is disclosed comprising a source of radiation; a waveguide receptive of the radiation for guiding the radiation therealong. A coupling mechanism engages or disengages the waveguide to or from an endoscope. An attenuator is deployed in a first position when the waveguide is engaged to the endoscope and deployed in a second position when the waveguide is disengaged from the endoscope. When the attenuator is deployed in the first position, the radiation passes from the waveguide to the endoscope and when the attenuator is in the second position, the radiation is at least partially blocked from passing from the waveguide to the endoscope or from exiting the waveguide. A releasable coupling mechanism for engaging a waveguide to an endoscope or disengaging the waveguide from the endoscope is disclosed. The waveguide is operative to guide radiation from a source of radiation to the endoscope. The coupling mechanism comprises a housing defining a cavity symmetric about an axis and receptive of a male fitting of the endoscope. An attenuator is positioned within the cavity and deployable in a first position when the waveguide is engaged to the endoscope and deployable in a second position when the waveguide is disengaged from the endoscope. When the attenuator is deployed in the first position, the radiation passes from the waveguide to the endoscope and when the attenuator is deployed in the second position, the radiation exiting the waveguide is at least partially blocked. The attenuator comprises a cantilever beam having first and second ends. The cantilever beam is secured to a base at one end and positioned so as to extend toward the axis at an angle.

It should be understood that any reference to first, second, front, rear, etc. or any other phrase indicating the relative position of one element or device with respect to another is for the purposes of explanation of the invention and, unless other wise noted, is not to be construed as limiting the invention. Furthermore, while preferred embodiments have been shown and described, various modifications may be made thereto without departing from the true spirit and scope of the invention. Accordingly, it is to be understood that the present invention has been described by way of illustration and not limitation.

What is claimed is:

1. An endoscopic system comprising:
   a source of radiation;
   a waveguide, having proximal and distal ends, the proximal end coupled to said source of radiation and the distal end coupled to an endoscope, said waveguide receptive of the radiation for guiding the radiation therealong to the endoscope;
   a mechanism positioned at the distal end of said waveguide engaging the waveguide to the endoscope or disengaging the waveguide from the endoscope; and an attenuator, positioned within the waveguide, blocking at least a portion of the radiation exiting the waveguide when the waveguide is disengaged from the endoscope.

2. The endoscopic system as set forth in claim 1 wherein the attenuator is deployed in a first position when the waveguide is engaged to the endoscope and deployed in a second position when the waveguide is disengaged from the endoscope; and
   wherein when the attenuator is deployed in the first position, the radiation passes from the waveguide to the endoscope and when the attenuator is in the second position, the radiation exiting the waveguide is at least partially blocked.

3. The endoscopic system as set forth in claim 2 wherein the mechanism for engaging the waveguide to the endoscope or disengaging the waveguide from the endoscope comprises a female part receptive of a male part.

4. The endoscopic system as set forth in claim 3 wherein the attenuator comprises a sleeve symmetric about an axis and receptive of the male and female parts.

5. The endoscopic system as set forth in claim 4 wherein the sleeve includes a set of cantilever beams extending from the sleeve toward the axis.

6. The endoscopic system as set forth in claim 5 wherein the set of cantilever beams is formed from the sleeve.

7. The endoscopic system as set forth in claim 5 wherein the cantilever beam includes a curved lip at a free end of the cantilever beam.

8. The endoscopic system as set forth in claim 7 wherein the lip is curved away from the axis.

9. The endoscopic system as set forth in claim 3 wherein the female part includes a housing defining a cavity symmetric about an axis.

10. The endoscopic system as set forth in claim 9 wherein the attenuator is positioned within the cavity.

11. The endoscopic system as set forth in claim 10 wherein the attenuator comprises a set of cantilever beams extending from the housing toward the axis.

12. The endoscopic system as set forth in claim 11 wherein the attenuator comprises a pliable material.

13. The attenuator as set forth in claim 12 wherein the pliable material is a shape memory alloy or stainless steel.

14. The attenuator as set forth in claim 13 wherein the shape memory alloy is taken from the group consisting of Nickel/Titanium alloy and Bronze/Phosphorus alloy.

15. The endoscopic system as set forth in claim 2 wherein the mechanism for engaging the waveguide to the endoscope or disengaging the waveguide from the endoscope comprises a male part engageable to a female part.

16. The endoscopic system as set forth in claim 1 wherein said attenuator is positioned within said mechanism.

17. The endoscopic system as set forth in claim 1 wherein said attenuator is positioned at a distal end of said waveguide.

18. An endoscopic system comprising:
   a source of radiation;
   a waveguide, having proximal and distal ends, the proximal end coupled to said source of radiation and the distal end coupled to an endoscope, the radiation generated by said source of radiation transmitted to the endoscope along said waveguide to form a radiation path;
   a mechanism, positioned at the distal end of said waveguide for disconnecting the waveguide from the endoscope; and
   an attenuator, positioned within the waveguide along the radiation path, for attenuating at least a portion of the radiation exiting the waveguide when the waveguide is disconnected from the endoscope.

19. An endoscopic system comprising:
   a source of radiation;
   a waveguide having proximal and distal ends, the proximal end coupled to said source of radiation and the distal end detachably coupled to an endoscope;
   a mechanism positioned at the distal end of said waveguide detachably engaging the waveguide to the endoscope; and
   an attenuator, positioned within the waveguide, for varying the amount of radiation exiting the waveguide as the mechanism engages the waveguide to the endoscope or disengages the waveguide from the endoscope.

20. The endoscopic system as set forth in claim 19 wherein the attenuator is deployed in a first position when the waveguide is engaged to the endoscope and deployed in a second position when the waveguide is disengaged from the endoscope; and
   wherein when the attenuator is deployed in the first position, the radiation passes from the waveguide to the endoscope and when the attenuator is deployed in the second position, the radiation exiting the waveguide is at least partially blocked.

21. The endoscopic system as set forth in claim 20 wherein the mechanism for engaging the waveguide to the endoscope or disengaging the waveguide from the endoscope comprises a female part receptive of a male part.

22. The endoscopic system as set forth in claim 21 wherein the attenuator comprises a sleeve symmetric about an axis and receptive of the male and female parts.

23. The endoscopic system as set forth in claim 22 wherein the sleeve includes a set of cantilever beams extending from the sleeve toward the axis.

24. The endoscopic system as set forth in claim 23 wherein the set of cantilever beams is formed from the sleeve.

25. The endoscopic system as set forth in claim 23 wherein the cantilever beam includes a curved lip at a free end of the cantilever beam.

26. The endoscopic system as set forth in claim 21 wherein the female part includes a housing defining a cavity symmetric about an axis.

27. The endoscopic system as set forth in claim 26 wherein the attenuator is positioned within the cavity.

28. The endoscopic system as set forth in claim 27 wherein the attenuator comprises a set of cantilever beams extending from the housing toward the axis.

29. The endoscopic system as set forth in claim 28 wherein the attenuator comprises a pliable material.

30. The endoscopic system as set forth in claim 29 wherein the pliable material comprises a shape memory alloy or stainless steel.

31. The endoscopic system as set forth in claim 28 wherein the cantilever beam includes a curved lip at a free end of the cantilever beam.

* * * * *